(12) United States Patent
Chacker

(10) Patent No.: US 6,578,008 B1
(45) Date of Patent: Jun. 10, 2003

(54) METHOD AND SYSTEM FOR AN ONLINE TALENT BUSINESS

(76) Inventor: Aaron R. Chacker, 903 Morgan Rd., Rydal, PA (US) 19046

(*) Notice: Subject to any disclaimer, the term of this patent is extended or adjusted under 35 U.S.C. 154(b) by 0 days.

(21) Appl. No.: 09/481,671

(22) Filed: Jan. 12, 2000

(51) Int. Cl.[7] .............................................. G06F 17/60
(52) U.S. Cl. ...................................................... 705/10
(58) Field of Search ........................................ 705/10

(56) References Cited

U.S. PATENT DOCUMENTS

| | | | |
|---|---|---|---|
| 5,237,157 A | | 8/1993 | Kaplan |
| 5,629,867 A | | 5/1997 | Goldman |
| 5,758,257 A | * | 5/1998 | Herz et al. ..................... 455/2 |
| 5,963,916 A | * | 10/1999 | Kaplan ......................... 705/26 |

FOREIGN PATENT DOCUMENTS

JP     2001041826 A  *  2/2002

OTHER PUBLICATIONS

Markoff, www.garageband.com/htdb/companyinfo/nytimes12Sep1999.html, Bridging Two Worlds to Make Downloadable Music Profitable, Nov. 17, 1999.
Ganahl, www.garageband.com/htdb/comapnyinfo/sfExaminer26Sep1999.html, Ex–Talking Head Now turning heads for producing records, Nov. 17, 1999.
Luening, www.garageband.com/htdb/companyinfo/cnet30Sep1999.html, Music site brings bands out of the garage, Nov. 17, 1999.
www.garageband.com/htdb/companyinfo/Guardian101499.html, The Guardian, Oct. 14, 1999.
www.billboardtalentnet.com/new_info/artist_eng.html, BTN helps your Act Get Started, Nov. 17, 1999.
www.news.webnoize.com/item.rst48 ID=4203, Rolling Stone Editors to Pick Favorite Unsigned Acts, May 24, 1999.
www.rollingstone.tunes.com/sections/dds/text/artista-g.asp?atl=, Frequently asked questions for Artists, Nov. 17, 1999.
www.mp3.com/abotus.html?hpbbau, About MP3.com, Nov. 17, 1999.
www.iuma.com/About/, About IUMA, It all started at a time when companies weren't formed in Garages, Nov. 17, 1999.
Emusic www.Emusic.com/.
Launch www.launch.com/music.
My MP3 www.my.mp3.com/.
Musicmaker www.musicmaker.com/.
Tunes www.tunes.com/.

(List continued on next page.)

*Primary Examiner*—Kenneth R. Rice
(74) *Attorney, Agent, or Firm*—Caesar, Rivise, Bernstein, Cohen & Pokotilow, Ltd.

(57) ABSTRACT

A method and system for implementing an online talent business whereby large numbers of unknown artists can have their artistic works made available to the public and wherein the public votes on which artists they like and whereby the online talent business enters into business contracts with the artists based on the public voting. An interactive investment simulation game is also provided for public participation in evaluating the actual demand of unsigned artists. This online talent business is exemplified by an on-line record business but may encompass any online talent business, such as in the modeling industry or in the story-scripting business.

9 Claims, 8 Drawing Sheets

OTHER PUBLICATIONS

Amazon www.amazon.com/.
cdnow www.cdnow.com/.
AOL www.aol.com/.
Excite www.excite.com/.
Infoseek www.infoseek.go.com/.
Lycos www.lycos.com/.
Yahoo www.yahoo.com/.
Spinner www.spinner.com/.
Nullsoft www.nullsoft.com/.
Geocites www.geocites.yahoo.com/.
3dfx Index www.3dx.com/home/.
balthaser www.Balthaser.com./.
Miller Brewing Co. www.millerbrewing.com/.
eSignal www.esignal.com/.

* cited by examiner

METHOD AND SYSTEM FOR AN ONLINE TALENT BUSINESS

FIELD OF THE INVENTION

The invention relates generally to online business methods, and more specifically to a method for implementing an online record business whereby large numbers of unknown artists can have their music made available to the public and wherein the public votes on which artists they like and whereby the online record business enters into recording contracts based on the public voting.

BACKGROUND OF THE INVENTION

Music is one of the most popular forms of entertainment in the world, but it is also a big business. According to the Recording Industry Association of America, domestic sales of recorded music were $13.7 billion in 1998, or more than one-third of worldwide revenue.

Of the $13.7 billion in revenue, "rock" remained the dominant genre, with 25.7% of the market in 1998. The next most popular category was "country," with 14.1%. Rhythm and blues ("R&B") came in next at 12.8%, with "pop" and "rap" coming in at 10.0% and 9.7%, respectively. As can be seen, these five categories of music are responsible for over 72% of all sales, and it is these genres to which the present application is directed. Moreover, the buyers of these categories of music are also the most Internet-aware.

The compact disc (CD) became the dominant format for recorded music in 1992, the year in which its market share (in terms of dollars, not units) barely exceeded that of cassettes (46.5% vs. 43.6%). However, in terms of dollars, CDs now outsell cassettes by a 5-to-1 margin. The shift to this new format did not take place overnight, but it did take place. It is Applicants' belief that the same transformation from CDs to a purely digital format is inevitable.

The sale of prerecorded music is mostly of interest to the younger consumer, and over 73% of revenue is derived from buyers aged 10–39. The importance of this is the fact that, except for the 18.1% market share attributed to buyers 45 and older, the next greatest demographic segment is buyers aged 15–19, with 15.8% of the market; and it is this category of buyer that is among the most Internet-aware.

In 1998, 85.2% of music sales took place in retail stores, with record clubs having a distant 9% share of the market. By contrast, the Internet was in distant last place at only 1.1%. Given that the market for domestic music is almost $14 billion, each one-percent of additional market share translates into $140 million in sale, assuming no growth in the market as a whole.

The music industry has not changed very much during the last few decades. Record companies typically require artists to sign exclusive contracts, and in exchange, the record labels develop, distribute, and promote the music. Additionally, the major record labels (as well as several "independent" labels) control, to a great extent, the type and quantity of recorded music that consumers can buy.

This existing system limits artists and consumers in the following ways:

Few artists can sell enough music to cover the high distribution and promotion costs. These costs include producing CDs and tapes, inventory and retail chain management as well as television, print and radio promotions and public relations efforts.

The majority of artists can only reach limited audiences due to finite shelf space at retailers and limited air time on radio and television stations, thus limiting the choices available to consumers.

There is very little communication and exchange of information between artists and consumers. For example, artists do not readily know who is buying their music or how to contact them, and consumers often do not have an opportunity to interact directly with their favorite artists.

Because of these limitations, the number of artists served by the existing music distribution system is small compared to the universe of musicians with commercial aspirations. According to a recent Gallup poll, over 25% of the U.S. population over the age of twelve, or 53 million people, are active music-makers. In addition, according to the National Association of Music Merchants, approximately 62% of U.S. households contain an amateur musician. These musicians represent a broad spectrum of artists including hobbyists, amateurs, semi-professional and professional musicians.

The World-Wide Web is also emerging as an important source of music, dramatically altering the way consumers discover, listen to and purchase music. According to Jupiter Communications, domestic sales of recorded music over the Internet are projected to grow from approximately $327 million in 1999 to $2.6 billion in 2002. The Web offers music fans major advantages over traditional media, such as unprecedented interactivity and access to new and archived music content on demand. Since music initially appeared on the Web, the number and types of music Web sites have expanded to include content, e-commerce and downloadable music sites. As a result, both consumers and artists have embraced the Web as an attractive medium for exploring and distributing music content. Forrester Research estimates that approximately 50 million individuals will be capable of downloading and playing digital music by the end of 1999. In addition, a number of artists, such as Public Enemy, Green Day, Hole and Todd Rundgren, either sell CDs directly through their Web sites or allow visitors to purchase and download digital music.

In recent years, consumers have increasingly used their computers to play music. Dataquest estimates that in 1998, 30% of U.S. households had multimedia PCs with a sound card, speakers and either a CD-ROM or DVD-ROM drive. Consumers can now play CDs on their computers with the ease and fidelity formerly associated only with stereo systems.

However, music files can be very large. For example, a three-minute song can occupy more than thirty megabytes of storage. Storing and transferring audio files can be expensive and slow. To address this problem, compression formats have been developed. One of the first widely accepted standards for the compression of music was "mp3", adopted by the Moving Picture Experts Group (MPEG). There are also competitive formats that may receive more widespread industry and consumer acceptance. These formats have different and additional features including SDMI (Secure Digital Music Initiative) and proprietary audio formats from companies like Microsoft Corporation and AT&T Corp. The mp3 standard offers at least 10:1 compression and audio integrity at near-CD quality. Mp3 playback is currently available on most operating environments including Microsoft Windows 95, Windows 98, Windows NT and MacOS, most major versions of UNIX and many other operating environments.

Capitalizing on the growing popularity of mp3, Diamond Multimedia Systems, Inc. introduced the Rio, the first commercially available mp3 portable player, in November 1998.

Over 250,000 units have been sold to date. Several other manufacturers, including Creative Labs, Thompson Multimedia's RCA division, LG Electronics and Samsung, have recently released or announced plans to sell portable mp3 players.

The development of compression formats like mp3 has made it practical to transmit music over the Internet. However, until recently there have been few legitimate sources of downloadable music on the Internet.

The distribution method of recorded music has changed very little over time. Until recently, a typical arrangement required solid relationships between recording companies and distributors. It is believed that eventually, recording companies may distribute digitally their music directly to the consumer.

The following discussion relates to currently-available online promotion and distribution of music and music-related products.

Traditional music industries companies, including BMG Entertainment, a unit of Bertelsmann AG; EMI Group plc; Sony Corporation; Time Warner, Inc. and Universal Music Group, a unit of the Seagram Company Ltd. have recently entered in the online commercial community and are currently backing the SDMI security format.

Examples of providers of online music content are Emusic.com Inc. (formerly GoodNoise Corporation), Launch Media, Inc., Mp3.com, Musicmaker.com, and Tunes.com. Some of these companies offer artist services.

Examples of companies offering mp3 or other audio compression formats are AT&T Corp., IBM Corporation, Liquid Audio, Inc., Microsoft Corporation and RealNetworks, Inc. Some of these companies also offer customers the ability to download music from their web sites.

Examples of online music retailers are Amazon.com, Inc. and CDNow Inc., as well as online "portals" such as American Online, Inc., Excite, Inc., Infoseek Corporation, Lycos, Inc. and Yahoo, Inc.

In particular, Amazon.com has announced its launch of a digital-download area on its Web site, allowing free song downloads. In addition, America Online recently announced its acquisition of two Internet music companies, Spinner Networks, Inc. and Nullsoft, Inc. and stated its intent to offer downloadable music in leading formats.

Other companies have agreed to work together to offer music over the Internet. For example, in May 1999, Microsoft Corporation and Sony Corporation announced an agreement to pursue a number of cooperative activities. Sony has announced that it will make its music content downloadable from the Internet using Microsoft's multimedia software. In addition, Universal Music Group and BMG Entertainment have announced a joint venture to form an online music store, and Musicmaker.com recently announced that it signed an exclusive 5-year-licensing agreement for EMI's music catalogue for custom compilation CDs.

U.S. Pat. No. 5,237,157 (Kaplan) discloses a user interactive multi-media based point-of-preview system. In particular, this system comprises a kiosk station at which a user can preview music available on CDs at a retail store.

U.S. Pat. No. 5,963,916 (Kaplan) discloses a system for online user interactive multimedia based point-of-preview. An improvement to U.S. Pat. No. 5,237,157 (Kaplan), this system basically integrates a network web site as the source of pre-recorded products.

U.S. Pat. No. 5,629,867 (Goldman) discloses a digital radio broadcast station which includes a single online digital database having stored therein a plurality of at least several hundred different selections of music to be played and broadcast by the radio station.

In view of all of the above, there remains a need for an online record business that provides talent recruitment world-wide, from any artist that wishes to participate. Furthermore, there remains a need for an online record business that presents these artists' works for review by the consuming public and then obtains feedback from the consuming public on which artists the consuming public prefers. Finally, there remains a need for an online record business that awards recording contracts to participating artists based on the consuming public feedback.

OBJECTS OF THE INVENTION

Accordingly, it is the general object of this invention to provide an apparatus which improves upon and overcomes the disadvantages of the prior art.

It is another object of this invention to provide a method and system for implementing an online record business.

It is still another object of this invention to provide a method and system for implementing an online record business that provides for talent recruitment from artists world-wide.

It is still another object of this invention to provide a method and system for implementing an online record business that permits any artist to participate in the world-wide talent recruitment.

It is still another object of this invention to provide a method and system for accelerating and streamlining the process through which the record industry recruits new talent.

It is still yet a further object of this invention to provide for decreased talent acquisition costs, decreased marketing costs and decreased production costs.

It is still yet another object of this invention to provide a method and system for implementing an online record business that provides for retrieving and analyzing music-listening consumer feedback.

It is still yet another object of this invention to provide an interactive investment simulation game.

It is even a further object of this invention to provide a method and system for implementing an online record business that awards recording contracts based on the feedback from the music-listening consumer feedback.

It is even yet a further object of this invention to provide a virtual record label.

It is still yet another object of this invention to provide a method and system that offers participating artists the opportunity to upload and promote their music through their own Web page.

It still yet another object of this invention to provide a method and system for participating recording artists to reap the benefits of a multi-million dollar marketing campaign without spending any additional money of their own.

It is still yet another object of this invention to provide a method for providing one of the largest collections of music available online.

It is still yet another object of this invention to provide a method for browsing the large collection of music using multiple genre and geographical search classifications.

It is still yet another object of this invention to provide a method and system for providing an interactive music-based game for obtaining consuming public feedback.

It is still yet another object of this invention to provide a method and system for purchasing music in a cost and time efficient manner.

It is still yet another object of this invention to provide a method and system for building brand awareness through a combination of online and off-line advertising and promotional activities.

It is even yet a further object of this invention to provide a method and system for identifying international artists to add to the talent pool.

It is even yet another object of this invention to provide a method and system for multiple language content, multi-level geographical indexing, global reach and rankings.

SUMMARY OF THE INVENTION

These and other objects of the instant invention are achieved by providing a method for recruiting artists (e.g., musicians, models, authors, etc.) world-wide having artistic works (e.g., music, appearance, story scripts, etc.). The method comprises the steps of: (a) providing a web site over global computer networks (e.g., the Internet) by a support entity (e.g., an online record business, modeling business, story-scripting business, etc.); (b) communicating with the web site by the artists world-wide for uploading representations of their respective artistic works and personal information for evaluation by the support entity that supports the web site in order to recruit the artists; and (c) making each of the respective artistic works and personal information available to the consuming public for the review of the consuming public via the web site.

These and other objects of the instant invention are also achieved by providing a method for obtaining consumer feedback world-wide regarding artistic works (e.g., music, appearance, story scripts, etc.) by artists (e.g., musicians, models, authors, etc.). The method comprises the steps of: (a) providing a web site over global computer networks (e.g., the Internet) that make the artistic works available for consideration by the consuming public and wherein the web site is supported by a support entity (e.g., an online record business, modeling business, story-scripting business, etc.); and (b) communicating with the web site by the consuming public for providing feedback (e.g., using an interactive artist-investment simulation game) as to those artistic works that are preferred by the consuming public.

These and other objects of the instant invention are also achieved by providing a system for recruiting artists (e.g., musicians, models, authors, etc.) world-wide having artistic works ( ) and wherein the artistic works are loadable onto global computer networks (e.g., the Internet). The system comprises: a web site available on the global computer networks; an artist database in communication with the web site; and an artist works database in communication with the web site. The web site stores artist information in the artist database and stores the artistic works in the artist works database for consideration by the consuming public via the web site. The web site, artist database and artist works database are supported by a support entity (e.g., an online record business, modeling business, story-scripting business, etc.).

These and other objects of the instant invention are also achieved by providing a system for obtaining consumer feedback (e.g., via.an interactive artist-investment simulation game) world-wide regarding artistic works (e.g., music, appearance, story scripts, etc.) wherein the artistic works are loadable onto global computer networks (e.g, the Internet). The system comprises: a web site available on the global computer networks; an artist database in communication with the web site; an artist works database in communication with the web site; an end-user database in communication with the web site; a statistics database in communication with the web site; and content databases in communication with the web site. The web site stores artist information in the artist database, stores the artistic works in the artist works database, stores artist content in the content databases, stores consuming public information in the end-user database and stores web site use information by the consuming public in the statistics database. The artist database and the artist works database are searchable by the consuming public for consideration by the consuming public world-wide via the content database. In addition, the end-user database and the statistics database are utilized for analyzing the consuming public feedback.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
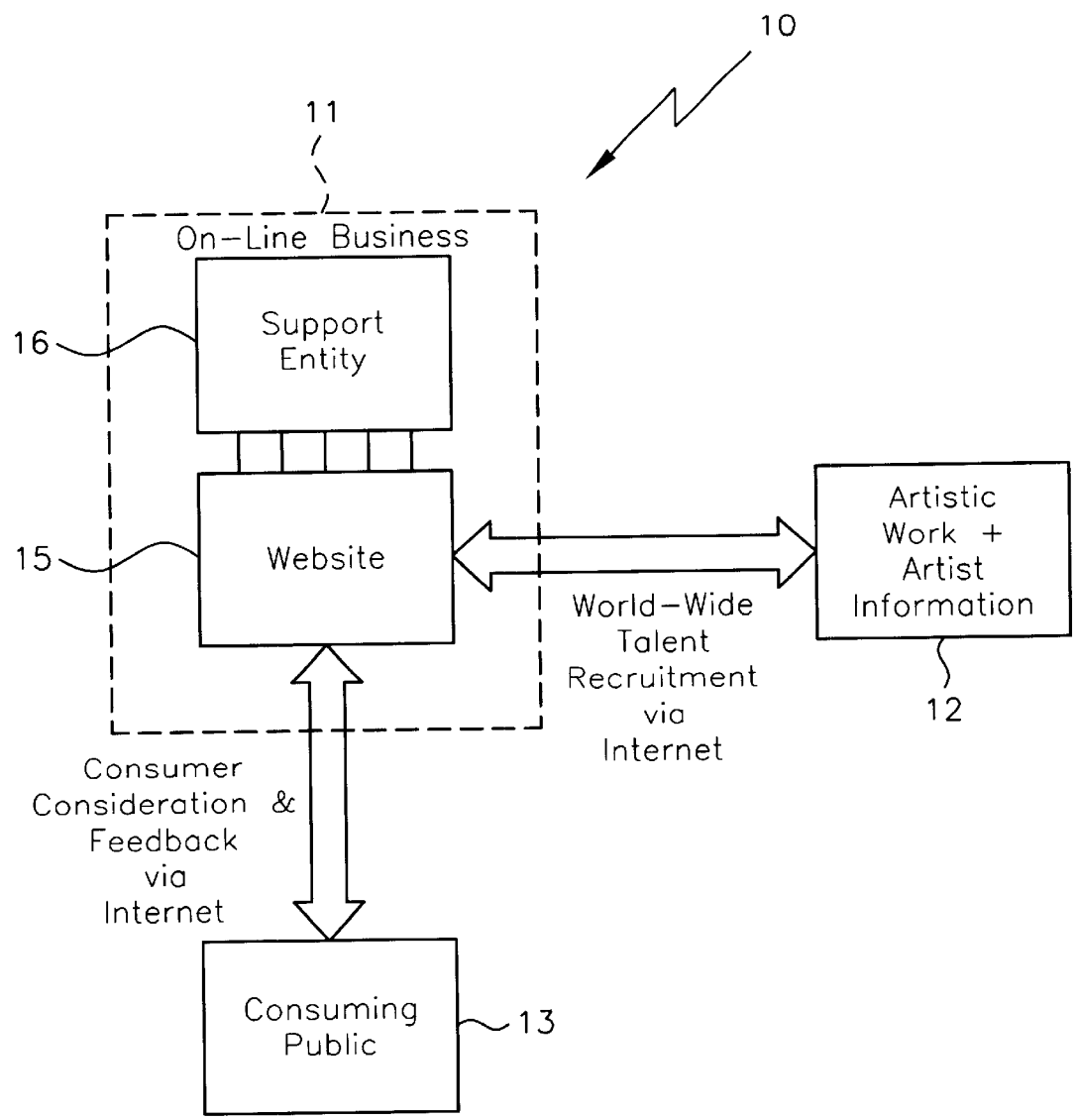
FIG. 1 is a block diagram of a method of an online business that recruits artistic talent world-wide using the Internet and also which utilizes consumer feedback to determine which artists are preferred by the consuming public.

Referring now in detail to the various figures of the drawing wherein like reference characters refer to like parts, there is shown at 10 in FIG. 1, a block diagram of a method of an online business 11 that recruits artistic talent 12 world-wide using the Internet and that also utilizes consumer feedback to determine which artists are preferred by the consuming public 13 so that a contract can be awarded from a contracting entity 14 to the preferred artists. The online business 11 basically comprises a web site 15 and the support entity 16 that runs the online business 11 and operates the web site 15. Artists from around the world, can upload representations of their respective works, as well as personal information, to the web site 15. The online business 11 then organizes the artist information and artistic works via artist profiles (to be discussed in detail later) that are available to the consuming public 13 at the web site 15. The consuming public can then review any artist and his/her respective artistic works. In addition, the consuming public can provide input (e.g., where the online business 11 is an online record label, the consuming public can "rate an artist's band" or post a message about the artist/band) via the artist profile (see FIG. 6).

Furthermore, to obtain consuming public 13 feedback regarding those artists preferred by the consuming public 13, an interactive investment simulation game 30 (as will be discussed in detail later) is available via the web site. In particular, all of the unsigned artists/artistic works are pre-selected by talent representatives of the online business (e.g., in the record business, the online record business uses artist and repetoire (A&R) representatives; see FIG. 3B; similarly, in the modeling business or story-scripting business analogous pre-selecting personnel are used) to determine their eligibility for the interactive simulation game 30. Those artists considered eligible to participate in the interactive investment simulation game 30 can be "voted on" by the consuming public 13 through virtual stock bought and sold by the consuming public 13, as will be discussed in detail later. Based on those artist(s) preferred by the consuming public, the online business 11 then awards those artists contracts and implements the contracts.

It should be understood that the method 10 set forth above has applications in many types of businesses, such as the record business, the modeling business, the story-scripting business, etc. When applied to the record business (as will be discussed in detail below), the support entity 16 is a record label and the artists/work 12 are musicians that want to promote their music/video; when applied to the modeling industry, the support entity 16 may be an online modeling agency seeking models to promote their clients' products or operation/services and the models send pertinent information (e.g., images, photographs, etc.) to the modeling agency 16 for consideration; when applied to the story scripting business, the support entity 16 may be a publisher or movie production company seeking a story line for a new book or movie. One of the key features of the method 10 is that it provides an artist, anywhere in the world, with the ability to have his/her talent presented to the consuming public for their consideration, thereby avoiding the current hurdles of not being able to even "get a foot in the door." Another key feature of the method 10 is that it lets the consuming public 13 decide who should be promoted to the next stage, i.e., contract, of bringing a new work of art to the world, thereby avoiding the support agency 16 always making that determination for the consuming public 13. For example, in the record industry, the record labels alone make the decision of which artists will be promoted.

Figure 2:
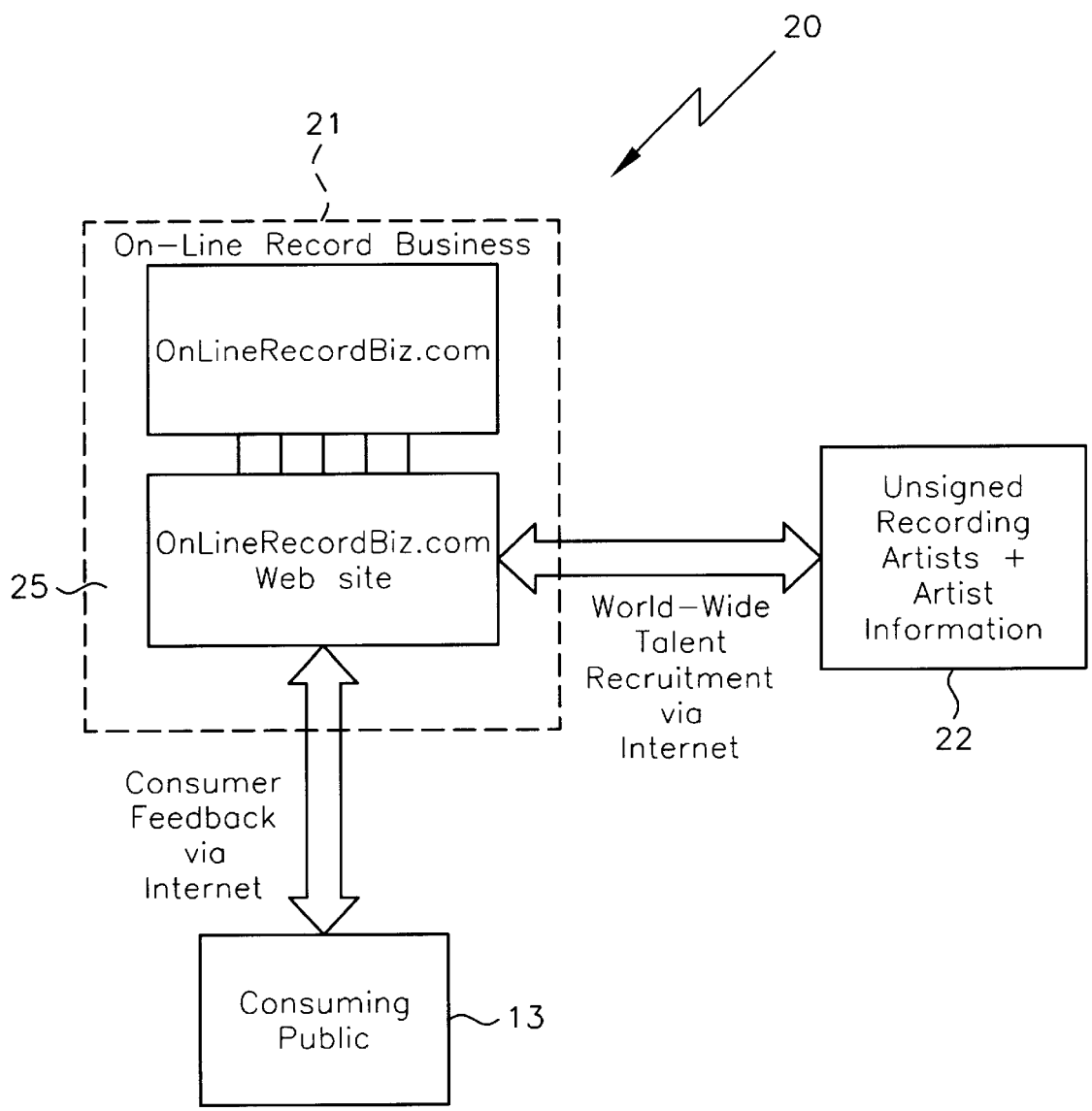
FIG. 2 is a is a block diagram of a method of an online record business that recruits artistic talent world-wide using the Internet and also which utilizes consumer feedback to determine which artists are preferred by the consuming public.

FIG. 2 depicts the method 10 implemented in the record business and is hereinafter referred to as the method 20. In particular, the method 20 comprises an online record business 21 that operates, supports and maintains a web site 25. As also shown in FIG. 2, the Online record business 21 is known as "OnlineRecordBiz.com" and supports the web site 25 having that URL (uniform resource locator). Unsigned recording artists 22, from around the world, interface with the online record business 21 via the Internet by uploading their music and personal information to the web site 25. By providing this interface, the online record business 21 greatly assists the unsigned artists 22 by avoiding all of the "hype" (at great expense and time to the artists 22) that normally would need to be created before a record label would even "give em a chance". In addition, the consuming public 13 can then access the web site 25 and review the various unsigned artists' music/information and listen to the artists' music. Following the pre-selecting of all of these unsigned artists by A&R representatives, the consuming public 13 can then "vote" (as will be discussed in detail later) on which artists' 22 music they prefer via the interactive investment simulation game 30. Since record labels are in the business to make money, the online record business 21 will award recording contracts to those unsigned artists 22 that are most preferred by the consuming public 13. Thus, the consuming public 13 drives the awarding of recording contracts, rather than the record label driving the awarding of recording contracts.

It should also be understood that the term "artist" when used with regard to the online record business means an artist as an individual or artist as a band.

Figure 3A:
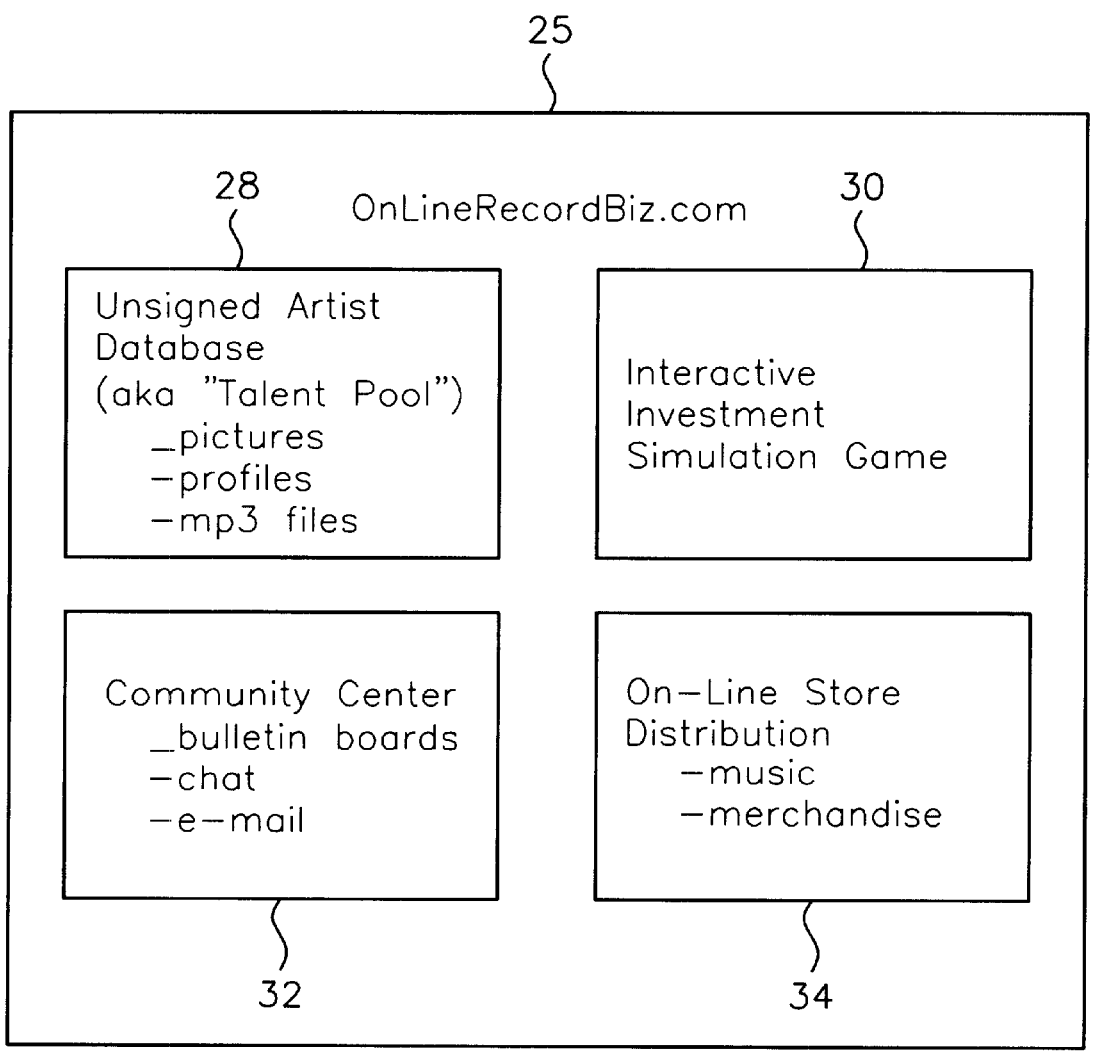
FIG. 3A is a block diagram of the main functions available to the user of the web site provided by the online record business.
Figure 3B:
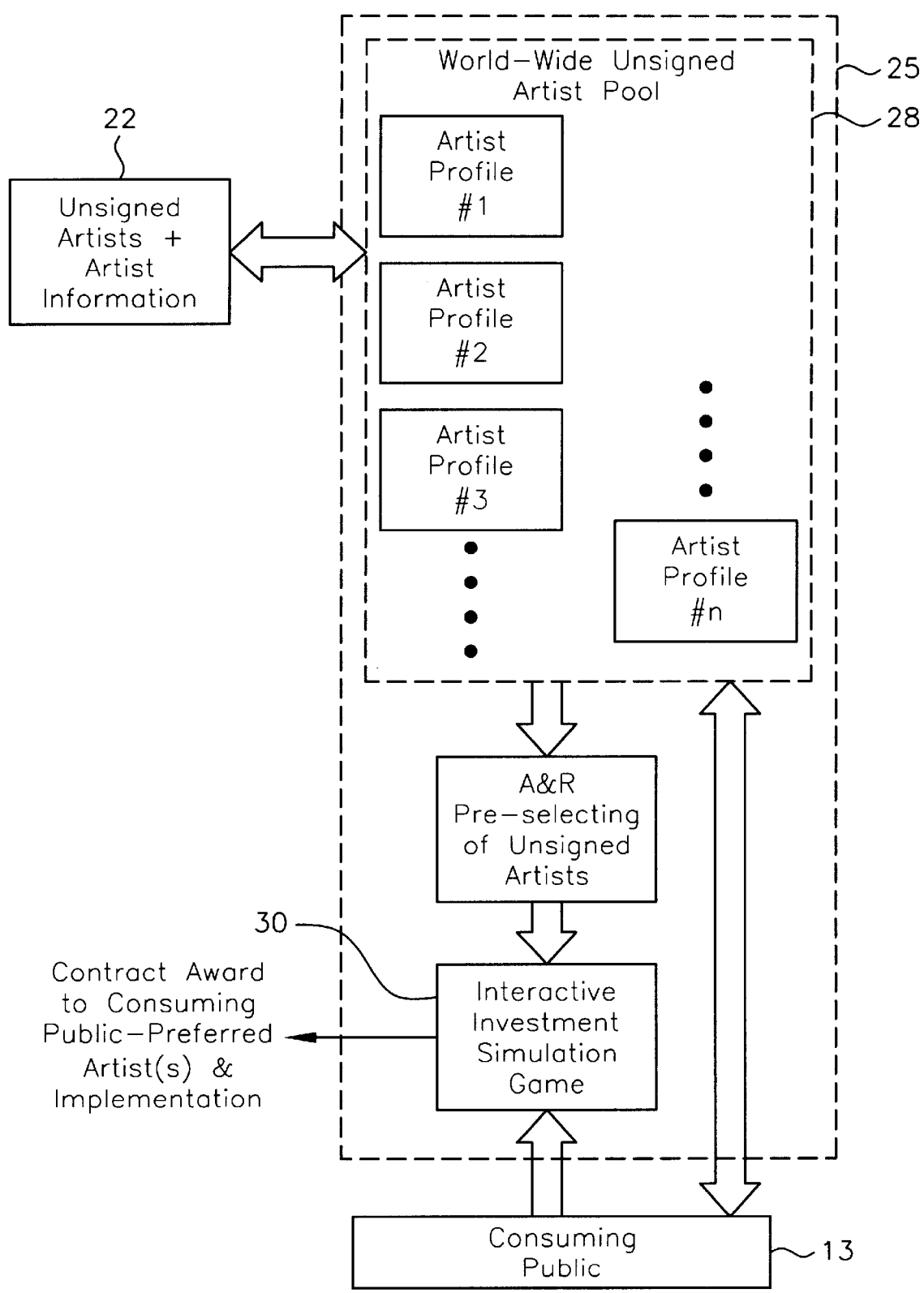
FIG. 3B is a functional diagram of the online record business.

FIG. 3A depicts a block diagram of the main functions available to the user of the OnlineRecordBiz.com web site 25. Through this web site 25, OnlineRecordBiz.com finds the best new artists from around the world, determines new artists' success potential before signing, markets its artists, and distribute its artists' music and merchandise. This method 20 provides for decreased talent acquisition costs, decreased marketing costs, and decreased production costs. In particular, users of the web site 25 can utilize the extensive unsigned artist database 28 which includes pictures, profiles and mp3 files. The users can also utilize an interactive investment simulation game 30, a community center 32 with bulletin boards, chat rooms and e-mail. The users can also utilize an online store 34 for music and merchandise distribution.

The unsigned artist database (also referred to as the "unsigned artist talent pool") 28 comprises an extensive database of unsigned recording artists 28 developed through both online and offline marketing techniques. Each artist is presented with the opportunity to create and maintain his/her own no-cost web page on the OnlineRecordBiz.com web site 25, known as artist profiles (see FIG. 6). Within their profiles, the artists share their relevant information, photographic images, at least one song, and one music video (if available). In particular, artists upload a photographic image, a text-based profile, up to three mp3 files and one video file. This is accomplished in a "do-it-yourself" fashion similar to the method used by GeoCities in permitting users to create their own pages. Furthermore, OnlineRecordBiz.com employs experienced talent scouts (i.e., the A&R representatives) to track the recording artists that join its talent pool. Talent scouts have access to daily, detailed statistics regarding each unsigned artist profile, including how many users traffic the profile, how many songs were listened to and downloaded, as well as access to interactive opinion polls and newsgroups contained within the artist profile. Those top artists are then invited to join the interactive investment simulation game 30 through which OnlineRecordBiz.com determines the actual appeal of the unsigned artist.

The interactive investment simulation game 30 is the key tool in evaluating the actual demand of the unsigned artists. Through the interactive investment simulation game 30, users virtually buy and sell stock in the more than 50 unsigned artists with imaginary money. Every few days, OnlineRecordBiz.com adds more unsigned artists to the interactive investment simulation game 30. Prices of the imaginary stocks are driven by the actual supply and demand as dictated by the traders. The top traders for each month or quarter receive various prizes such as T-shirts, CD's, cash and even a new car. In addition, the web site 25 includes a feedback section so that web site visitors can post their comments about the recording artist. Users who participate in the interactive investment simulation game 30 compete against thousands of other users daily in order to earn a variety of prizes. Moreover, through participation in the game, users actually take part in determining the next interactive investment simulation game 30 signed artist. The combination of the enjoyment and fun of the game with the power of the experience creates an exciting opportunity to OnlineRecordBiz.com users.

As mentioned previously, OnlineRecordBiz.com also uses A&R (Artist and Repertoire) representatives to watch the results of the interactive investment simulation game 30 to determine which unsigned recording artists have received the most favorable reception by the public. The artists that excel in the game 30 (i.e., the highest stock price) are traditionally scouted by the A&R representatives. If decided appropriate, those artists are then offered a recording contract with OnlineRecordBiz.com.

Once a particular artist warrants a OnlineRecordBiz.com contract (as reflected by the investment simulation game 30) OnlineRecordBiz.com actually signs the artist to a recording contract, utilizing several new media and traditional music industry marketing strategies to market its artists. For example, when OnlineRecordBiz.com signs a new artist to a recording contract, the company's site, the OnlineRecordBiz.com web site 25, features a 15 to 30 second animated introduction to introduce the new artist (e.g., see www.3dfx.com for a similar experience). The introduction contains information on the artist, graphics, and the artist's actual music as the user enjoys an exciting and unique experience. Furthermore, OnlineRecordBiz.com provides an individual web site for each of its signed artists. The site includes profile information, concert information, discographies, online videos, and other relevant information. After OnlineRecordBiz.com signs a particular artist, users receive a direct e-mail containing the signed artist's profile information, an attached digital download, an instant play hyperlink and a compact disc order form. In order to provide links to the new artist's web site, OnlineRecordBiz.com purchases banner advertisements on appropriate web sites to attract more potential users of the web site 25. In addition, OnlineRecordBiz.com uses television promotions, radio promotions, record store promotions and music videos to generate as much interest as possible in artists signed by OnlineRecordBiz.com. Furthermore, through the online store 34, OnlineRecordBiz.com offers users the opportunity to purchase signed artists' music, and merchandise directly through its site.

In addition to the unsigned artist talent database 28 and the interactive investment simulation game 30, OnlineRecordBiz.com offers services designed to instill a sense of community in the web site 25. Among these are e-mail accounts, chat rooms, bulletin boards, and interactive games. The web site 25 permits fans to contact artists directly via e-mail and to communicate with one another through message boards and chat. In addition, artists can use their artist profile to communicate directly with their fans, advising them of concerts and new releases and developing a fan email list.

The result of the method 20 is fourfold. First, it accelerates and streamlines the process through which the record industry recruits new talent. Second, the power to choose which recording artists become commercially popular resides in the hands of the consumer. As opposed to music being "pushed" through the channel by today's entertainment companies, music is "pulled" through by consumers who decide what they want to hear through the method 20.

Third, consumers have more music from more recording artists from which they can choose. Fourth, the industry experiences major "disintermediation," i.e., that dependence on a middle-man between suppliers and buyers (i.e., a retailer) is greatly reduced or eliminated. In order to better understand the value of the method 20, consider a brief examination of each of the four aforementioned results:

With regard to talent recruitment, by using the World Wide Web as its headquarters, OnlineRecordBiz.com essentially has a talent scout wherever there is a connection to the Internet, be it in North America, Asia, Europe or anywhere in the world. Therefore, OnlineRecordBiz.com has access to the best new talent from around the world before any other traditional music company.

With regard to consumer feedback, while traditional music companies rely solely upon their executives to predict those artists that will achieve commercial success, OnlineRecordBiz.com lets the music buying public decide. OnlineRecordBiz.com only signs those artists that have proven to be popular by the music-buying public. In doing so, OnlineRecordBiz.com greatly reduces the inefficiency currently plaguing the traditional music industry.

With regard to the consumers' music choice, via the expanding collection of artists in the unsigned artist database 28, the consuming public is provided with one of the largest databases of musical content available on the Internet. Consumers can listen to real-time or streaming audio or download thousands of songs posted on the web site 25 by artists to their personal computers free of charge, twenty-four hours a day. The music collection spans dozens of categorized genres, including pop, rock, classical, country, alternative, children's, easy listening, electronic, hip hop, rap, blues, jazz, international. Those music categories are searchable by genre, artists or location.

With regard to industry "disintermediation," once OnlineRecordBiz.com signs a particular artist to a recording contract, the company then makes that signed artist's music available for purchase in all reasonable formats, including digital, compact disk, and cassette tape, directly within the company web site 25. Considering that consumers (potential music buyers) already traffic the OnlineRecordBiz.com web site 25, it makes sense for the consumer to purchase the signed artist's music directly through the OnlineRecordBiz.com web site 25 and not a traditional third party retailer. As consumer acceptance of the new digital distribution systems pick up, OnlineRecordBiz.com completely eliminates the need for a distributor and retailer, greatly increasing the revenue of OnlineRecordBiz.com as well as its artist.

Figure 4:
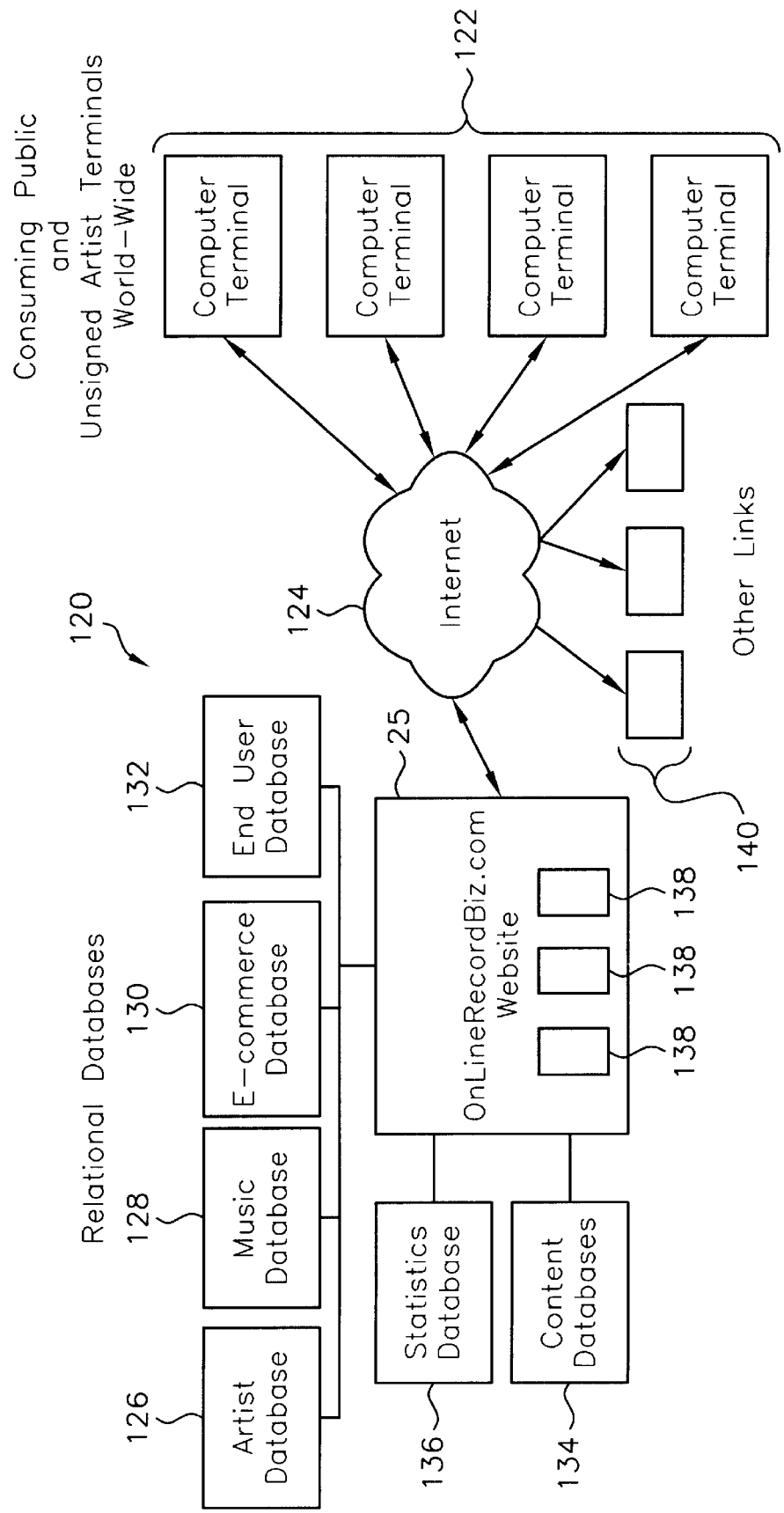
FIG. 4 is a block diagram of a system that depicts an implementation of the method for the online record business.

FIG. 4 is a diagram of a system 120 that depicts an implementation of the method 20 for the online record business. In general, the system uses servers, networks, computer terminals and other conventional systems, subsystems and components that are known in the art which are necessary for Internet communication.

In particular, the system comprises a plurality of consuming public and unsigned artist terminals 122 for interaction with the Internet 124. OnlineRecordBiz.com's web site 25, as will be discussed in detail, is available via the Internet 124. The web site 25 communicates with, and maintains, a plurality of relational databases, namely, an artist database 126, a music database 128, an e-commerce database 130 and an end-user database 132. These databases are used to enhance the user experience at the web site 25 and to provide OnlineRecordBiz.com with valuable information for marketing and sales activities. Content databases 134 make content available for download, CD purchase, web site ranking and cataloging and are updated as artists and users interact with the web site 25. Statistics databases 136 maintain traffic and site analysis information including the number of times that web pages were viewed, download counts and artist/song rankings. The end-user database 132 and e-commerce database 130, which are firewalled for protection, contain customer information and transaction histories.

As mentioned previously, each participating artist has his/her artist profile 138 within the OnlineRecordBiz.com web site 25 as supported by, among other things, the artist database 126 and the music database 128. It should be understood that the artist database 126 and the music database 128 encompass the unsigned artist database 28 mentioned earlier.

Finally, other links 140 (e.g., ticketing agencies) are also available via the Internet 124 as part of the system 120.

The technology infrastructure is based on architecture designed to be secure, reliable and expandable. Software used in the system 120 is a combination of proprietary applications, third party database software, and open operating systems that support acquisition of content, management of that content, publication of the web site 25, downloads of music and media files, registration and tracking of users, reporting of information for both internal and external use.

The infrastructure is designed to allow each component to be independently scaled, usually by purchasing additional readily-available hardware and software components, to meet or exceed future capacity requirements.

All servers, networks and systems are monitored on a continuous basis. Numerous levels of firewall systems are implemented to protect the databases, electronic commerce servers, customer information and music archive. Backups of all databases, data and media files are performed on a daily basis. Data back-up takes are archived at a remote location on a weekly basis.

The OnlineRecordBiz.com web site 25 can support new technology formats and standards, including a variety of leading audio compression formats. Music in offered in both the mp3 and RealAudio formats, as well as in the still popular CD format.

The web site 25 incorporates the latest technologies, featuring the use of Macromedia's Flash 4 and Shockwave to make the web site 25 one of the most exciting and creative destinations on the web. Moreover, the site offers four to five languages other than English.

Figure 5:
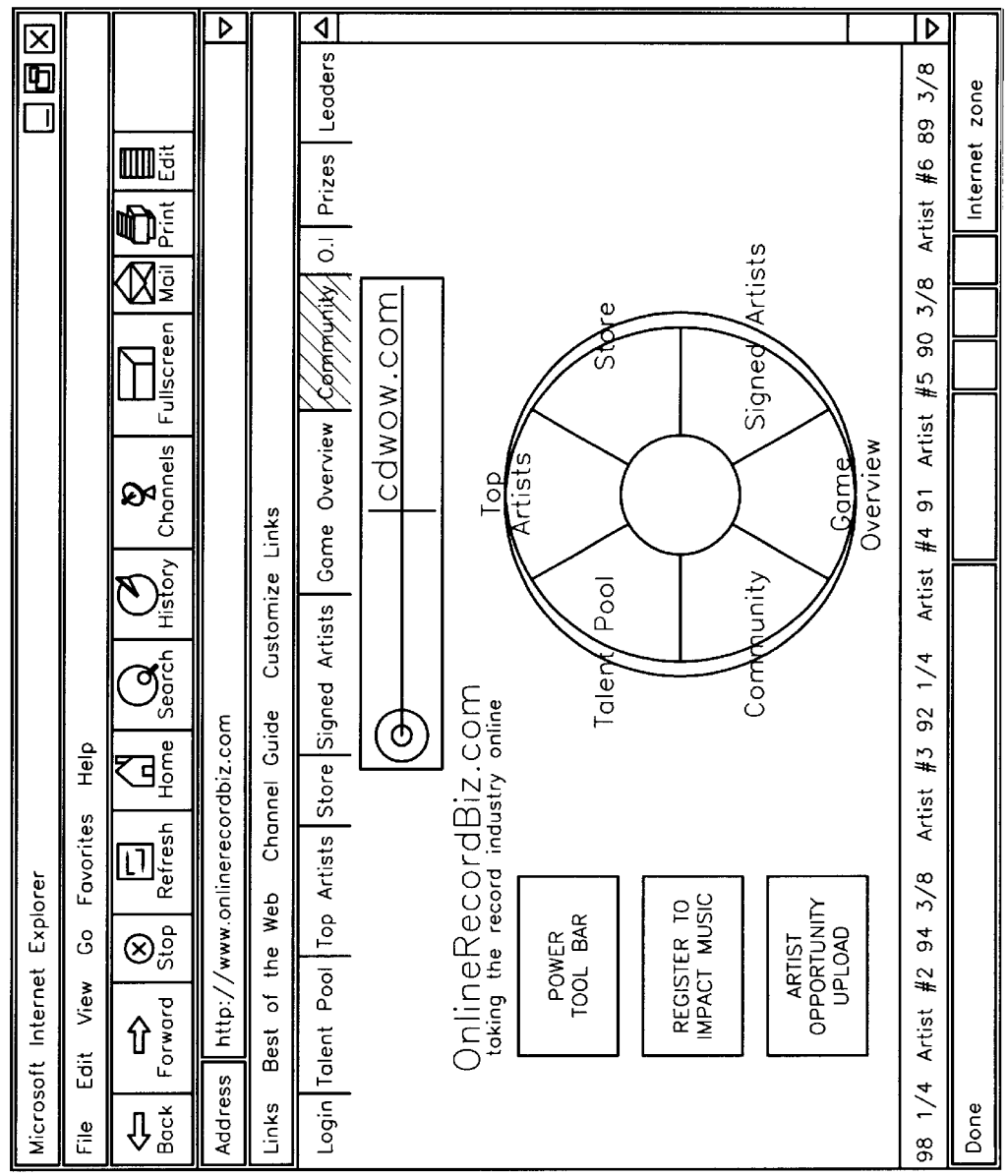
FIG. 5 is a display screen view of the home page web site for the online record business.
Figure 6:
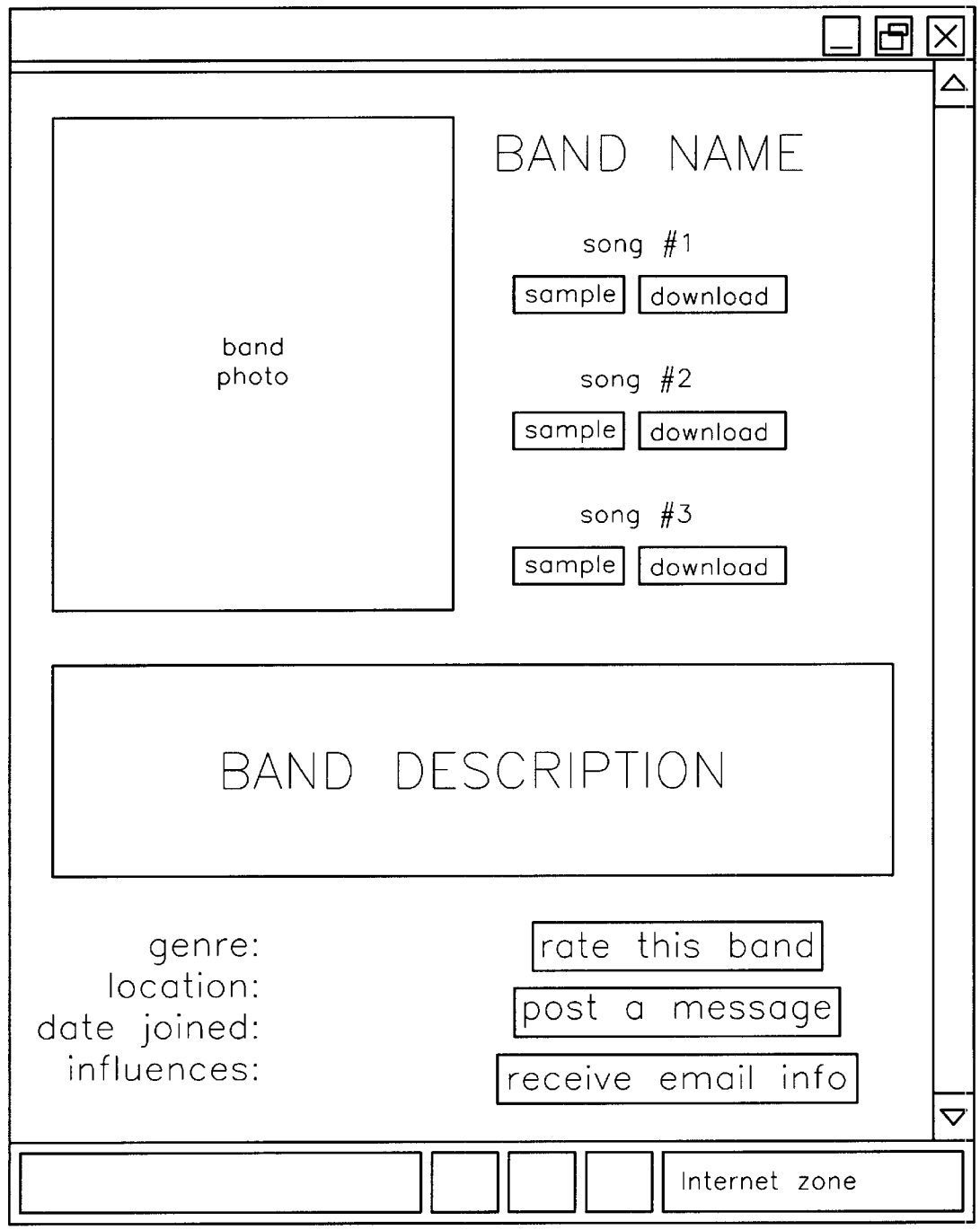
FIG. 6 is a display screen view of an exemplary unsigned artist profile available at the web site of the online record business.
Figure 7:
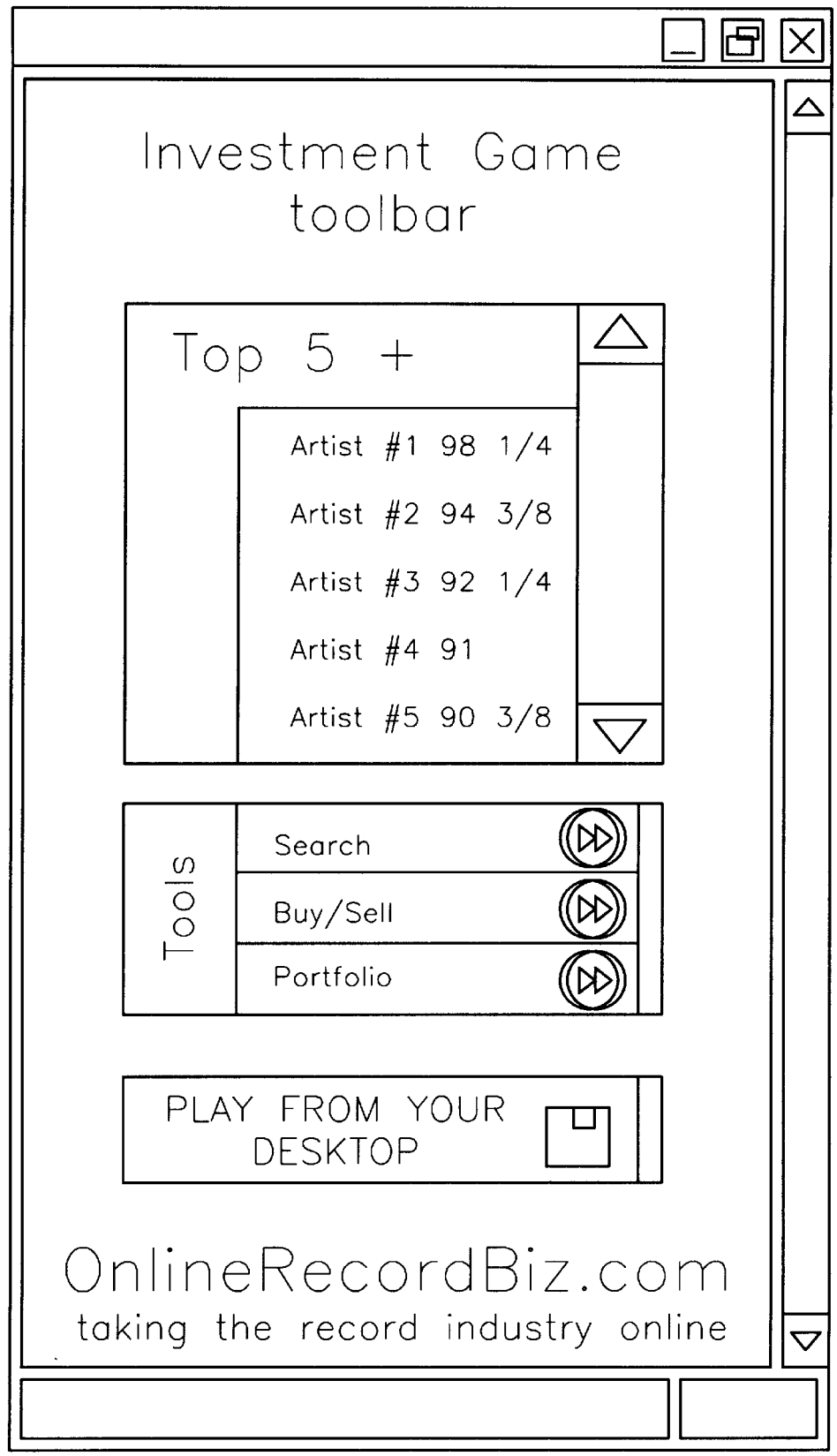
FIG. 7 is a pop-up toolbar for the interactive investment simulation game.

The OnlineRecordBiz.com web site 25 is discussed in further detail below. It should be understood that although record industry terminology and symbology are shown in FIGS. 5–7, it is within the broadest scope of this application to include other industry/business terminology and symbology, e.g., the modeling industry and story-scripting business, in each of those figures; thus, as a result, FIGS. 5–7 are exemplary only in that other industries/businesses may modify the language and icons of FIGS. 5–7 to meet their respective terminologies and symbologies.

As mentioned previously, a 15-second powerful introduction greets the user to the OnlineRecordBiz.com web site 25, introducing the company through a powerful flash presentation incorporating text, graphics, and music (see www-.balthaser.com for a similar experience). Upon completion of the introduction, the OnlineRecordBiz.com home page (FIG. 5) is loaded along with the Investment Game Toolbar pop-up window (FIG. 7).

The home page (FIG. 5) links the user to five optional sections: (1) the OnlineRecordBiz.com Talent Pool, (2) Top Artists, (3) the OnlineRecordBiz.com Brand Store, (4) OnlineRecordBiz.com Artists (4) the Investment Game Overview, and (5) the OnlineRecordBiz.com Community Center (OnlineRecordBiz.com Lounge). Each option is presented through an image map showing partial graphics of each individual station compiled into one circular graphic (see www.millerbrewing.com as a reference). A navigation bar is displayed along the top window margin of the OnlineRecordBiz.com home page. The user can find links to the several important OnlineRecordBiz.com sections and services. Among those sections included on the toolbar are: Login/Register, Talent Pool, Top Artists, Store, OnlineRecordBiz.com Artists, Game Overview, Community, DJ, Prizes, and Leaders. A real time ticker showing the updated artist price quotes of that particular user's portfolio sits along the bottom margin of the OnlineRecordBiz.com home page. The ticker resembles those tickers found on nonfantasy investment sites. The user can click on a particular ticker symbol to view a description of the artist.

The OnlineRecordBiz.com Talent Pool: The talent pool is the unsigned artist section of the OnlineRecordBiz.com site. As mentioned earlier, users can view profiles 138 (FIG. 6) of artists contained within the extensive pool of unsigned artists that appear on the OnlineRecordBiz.com web site 25. Each profile 138 contains important information about the artist. In the upper left corner of the profile window is a picture of the artist. To the right and below the picture is the artist's name, songs available for sampling and download, a brief description, and other relevant information. Below the artist's description is an interactive weekly survey (e.g. generating opinion polls), a link to that artist's individual newsgroup (e.g., for disseminating information about the artists and the consuming public input), and a button allowing users to "join this band's email list" (e.g., using e-mail listserves).

Top Artist Stocks: The music artist stocks offered section of the site links the user to a list of all of those artists available for ranking on the Investment Game (music artists that can be traded in the game) and their current stock price. The artists are categorized into nine categories: (1) hip hop, (2) R&B, (3) jazz, (4) classical, (5) new age, (6) pop, (7) alternative, (8) rock/pop, and (9) country. Each band name listed is linked to that artist's profile.

The OnlineRecordBiz.com Records Store: In the OnlineRecordBiz.com Records store users can purchase OnlineRecordBiz.com music and brand-name merchandise. Among the merchandise offered is OnlineRecordBiz.com signed artists' downloadable digital and deliverable CD and cassette tape music, OnlineRecordBiz.com T-shirts, Polo shirts, hats, sweatshirts, mugs, distinctive shot glasses, books, lighters, can openers, pitchers, mouse pads, and others.

OnlineRecordBiz.com Signed Artists: In the OnlineRecordBiz.com Signed Artist sections users find information on the signed OnlineRecordBiz.com artists. Each artist has his/her own web site within the OnlineRecordBiz.com web site 25 that features information on the artist, including profile information, concert information, discographies, online videos, and other relevant information. As more artists are signed, this section grows to be an invaluable marketing tool for OnlineRecordBiz.com.

The Game Overview: The Game Overview is the "how to play" section of the OnlineRecordBiz.com web site 25. The interactive teaching instrument educates the user through a logical progression of flowing page interactions, as well as contains specific links to other help sections. One example of a similar instructional resource can be found at Miller Brewing Company's web site at www.millerbrewing.com/a_lite_section/index.asp (see Pilsner Beer Story) and the Esignal web site at www.esignal.com/flash_demo.htm.

The OnlineRecordBiz.com Community Center (The OnlineRecordBiz.com Lounge): The OnlineRecordBiz.com Community Center offers many of those options found on a standard music community web site such as Billboard Online and Rolling Stone Online. Among those options are live concerts, chat sessions, daily news, newsgroups, and email. In addition to those common features, OnlineRecordBiz.com offers the OnlineRecordBiz.com leader board, OnlineRecordBiz.com postcards, OnlineRecordBiz.com member web pages, and OnlineRecordBiz.com interactive games.

The OnlineRecordBiz.com Power Toolbar (FIG. 7) is an individual pop-up window that acts as OnlineRecordBiz.com Record's consumer feedback portion of the web site 25. Within this section, all artists involved in the interactive investment simulation game 30 are listed along with the user's buy/sell tools and other necessary features.

At the top of the window is the OnlineRecordBiz.com game logo. Below the OnlineRecordBiz.com logo is a scrollable ranking of the artists in the OnlineRecordBiz.com game. Each name contains a hyperlink to each artist's profile 138. The top five artists are visible at window launch, but all others can be reached through the scrollbar.

Below the OnlineRecordBiz.com artist list is the user's investment toolbar. With the toolbar, the user can utilize three features: (1) enter a quick search of a particular artist's name or ticker symbol, (2) buy or sell a particular quantity of shares, and (3) see his/her current revenue and portfolio. Each individual feature links to a new window. The quick search feature links to a full description of the particular searched artist. The buying and selling tools link to a confirmation screen that finalizes the trade. When the user clicks on the portfolio link, he/she can view his/her current artist stocks, balance, and other relevant information. Below the portfolio is a description of each prize the user can win if he/she attains a certain amount of money. Below the OnlineRecordBiz.com Investment Toolbar the user can download a desktop version of the Investment Challenge and link back to the OnlineRecordBiz.com home page (FIG. 5).

Without further elaboration, the foregoing will so fully illustrate my invention that others may, by applying current or future knowledge, readily adopt the same for use under various conditions of service.

I claim:

1. A method for recruiting artists world-wide having artistic works, said method comprising the steps of:

(a) providing a web site over global computer networks by a support entity for recruiting artists;

(b) communicating with said web site by the artists world-wide for uploading representations of their respective artistic works and personal information to said web site in order to recruit the artists;

(c) making at least one of the respective artistic works and personal information available to the consuming public for the review of the consuming public via said web site;

(d) obtaining consumer feedback from the consuming public via said web site regarding which of the artistic works the consuming public prefers; and (e) engaging those artists in contracts with said support entity or with a third party associated with said support entity based on said consumer feedback.

2. The method of claim 1 further comprising the step of generating an opinion poll based on said consumer feedback.

3. The method of claim 1 further comprising the step of utilizing newsgroups over said global computer networks for disseminating information about the artists and said consumer feedback.

4. The method of claim 1 further comprising the step of utilizing e-mail listserves for disseminating artist information to individuals of the consuming public that have selected to receive such information.

5. The method of claim 1 further comprising the step of providing said online record business with daily, detailed information regarding how many people reviewed each of said artist profiles and how many people listened to their songs.

6. The method of claim 5 wherein said daily, detailed information further comprises how many people downloaded their songs.

7. The method of claim 1 further comprising the step of providing multiple language content at said web site for permitting the recruitment of artist talent world-wide.

8. A system for recruiting artists world-wide having artistic works wherein the artistic works are loadable onto global computer networks and wherein said system is operated by a support entity, said system comprising:

a web site available on the global computer networks;

an artist database in communication with said web site;

an artist works database in communication with said web site;

an end-user database in communication with said web site;

a statistics database in communication with said web site; and content databases in communication with said web site, said web site storing artist information in said artist database, storing the artistic works in said artist work database, storing artist content in said content databases, storing consuming public information in said end-user database and storing web site use information by the consuming public in said statistics database, said artist database and said artist works database being searchable by the consuming public for consideration by the consuming public worldwide via said content databases, and wherein said end-user database and said statistics database are utilized for analyzing said consuming public feedback and for engaging those artists in contracts with said support entity or with a third party associated with said support entity based on said consumer feedback.

9. The system of claim 8 wherein said artistic work is music, wherein said artistic work database is a music database and wherein said web site is an online record business web site.

* * * * *

UNITED STATES PATENT AND TRADEMARK OFFICE
CERTIFICATE OF CORRECTION

PATENT NO. : 6,578,008 B1 Page 1 of 1
DATED : June 10, 2003
INVENTOR(S) : Aaron R. Chacker It is certified that error appears in the above-identified patent and that said Letters Patent is hereby corrected as shown below:

Drawings,
Fig. 5, the divider label "O.1" next to the word "Prizes" should be -- DJ --.

Signed and Sealed this

Twenty-second Day of June, 2004

JON W. DUDAS
*Acting Director of the United States Patent and Trademark Office*